US006784905B2

(12) United States Patent
Brown et al.

(10) Patent No.: US 6,784,905 B2
(45) Date of Patent: Aug. 31, 2004

(54) APPLYING TRANSLUCENT FILTERS ACCORDING TO VISUAL DISABILITY NEEDS

(75) Inventors: Michael Wayne Brown, Georgetown, TX (US); Kelvin Roderick Lawrence, Round Rock, TX (US); Michael A. Paolini, Austin, TX (US); Richard Scott Schwerdtfeger, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 10/054,445

(22) Filed: Jan. 22, 2002

(65) Prior Publication Data

US 2003/0137470 A1 Jul. 24, 2003

(51) Int. Cl.[7] .................................................. G09G 5/00
(52) U.S. Cl. ........................ 345/865; 345/592; 345/768; 345/790; 345/803; 382/114; 382/260; 382/263; 382/264; 382/162
(58) Field of Search .............................. 345/592, 768, 345/790, 803, 865; 382/114

(56) References Cited

U.S. PATENT DOCUMENTS

| | | | |
|---|---|---|---|
| 5,150,457 A | | 9/1992 | Behm et al. ................. 395/120 |
| 5,267,331 A | * | 11/1993 | Siwoff ........................ 382/274 |
| 5,388,207 A | | 2/1995 | Chia et al. .................. 395/164 |
| 5,617,527 A | | 4/1997 | Kressin et al. .............. 395/326 |
| 5,627,960 A | | 5/1997 | Clifford et al. ............. 395/352 |
| 5,651,107 A | | 7/1997 | Frank et al. ................ 395/344 |
| 5,678,015 A | | 10/1997 | Goh ........................... 395/355 |
| 5,764,229 A | | 6/1998 | Bennett ...................... 345/345 |
| 5,896,131 A | | 4/1999 | Alexander .................. 345/340 |
| 5,949,432 A | | 9/1999 | Gough et al. ............... 345/435 |
| 6,118,427 A | | 9/2000 | Buxton et al. .............. 345/113 |
| 6,429,883 B1 | * | 8/2002 | Plow et al. ................. 345/768 |
| 6,538,660 B1 | * | 3/2003 | Celi et al. .................. 345/592 |
| 6,633,407 B1 | * | 10/2003 | Kim et al. .................. 358/1.9 |
| 2001/0053246 A1 | * | 12/2001 | Tachibana et al. .......... 382/162 |

FOREIGN PATENT DOCUMENTS

WO    WO 97/41547    11/1997    ............ G09G/3/30

OTHER PUBLICATIONS

Dayton et al. "PhotoShop 5/5.5 Wow! Book." Peachpit Press. ©2000. pp. 185–193 & 196–197.*

Myers et al., "Image Perception and Enhancement for the Visually Impaired," IEEE Engineering in Medicine and Biology. Sep./Oct. 1995. p. 594–602. Date accessed Mar. 3, 2004.*

Peli et al. "Image Enhancement for the Visually Impaired: The effects of Enhancement on Face Regonition," Optical Society of America. Jul. 1994. vol. 11, No. 7. p. 1929–1039. Date accessed Mar. 3, 2004.*

IBM Technical Disclosure Bulletin "Translucent Window Attribute" vol. 36, no. 06A, Jun. 1993 pp. 135–136.

IBM Technical Disclosure Bulletin "Overlay Mechanism for Annotating Sharing and Remote Window Control" vol 36, No. 06A, Jun. 1993 pp. 407–409.

(List continued on next page.)

Primary Examiner—Matthew C. Bella
Assistant Examiner—Antonio Caschera
(74) Attorney, Agent, or Firm—Marilyn Smith Dawkins

(57) ABSTRACT

A method, system and program for selectively applying translucent filters to graphical images according to visual disability needs are provided. A selection of a filter for a particular user is received. The filter is applied to at least a portion of an original image. The original image is then graphically displayed overlayed by the filter within a user interface, such that the original image is adjusted to specifically accommodate for a visual disability of the particular user.

24 Claims, 3 Drawing Sheets

OTHER PUBLICATIONS

IBM Technical Disclosure Bulletin "Translucent Windows: Dragging an Image without Obscuring the Desktop:", vol 37, No. 10, Oct. 1994 p. 15.

IBM Research Disclosure 426114 "Multi–modal Data Access" Oct. 1999 pp. 1393–96.

IBM Dockett AUS920010534US1 Applying Translucent Filters According to Visual Disability Needs in a Network Environment.

Make the Language Bar Transparent, 1 page, wysiwyg://fraContent.fraRightFrame.50/ht . . . olbar_change_transparency.asp?frame=true.

TUCOWS Shell Enhancements Trans–XP, 2 pages, wysiwyg://20/http://www.tucows.com/system/preview/232626.html.

The Iconfactory: Your Quality Freeware Icons Hub (ibxp_home.asp), 2 pages, http://www.iconfactory.com/ibxp_home.asp.

Tweak_XP, 2 pages, http://www.totalidea.ce/transxp.htm.

Trans–XP Information, Details, and Download from VoodooFiles.com, 1 page, wysiwyg://15/http://www.voodoofiles.com/5817.

Cronosoft, 1 page, wysiwyg://26/http://www.cronosoft.com/download/qhwxp/index.htm.

Windows XP Home Page, 1 page, wysiwyg://33/http://www.microsoft.com/windowssxp/default.asp.

* cited by examiner

APPLYING TRANSLUCENT FILTERS ACCORDING TO VISUAL DISABILITY NEEDS

CROSS-REFERENCE TO RELATED APPLICATIONS

The present application is related to the following copending application, which is filed on even date herewith and incorporated herein by reference:

(1) U.S. patent application Ser. No. 10/054,446.

BACKGROUND OF THE INVENTION

1. Technical Field

The present invention relates in general to computer systems with graphical user interfaces and, in particular, to applying tinted transparent filters to graphical images. Still more particularly, the present invention relates to applying an adjustable transparent filter to a graphical user interface according to visual disability needs.

2. Description of the Related Art

Computer technology is continuously expanding, resulting in modern computer systems which provide increased performance. In particular, as computer technology expands, technologies that aid those with visual disabilities also continue to expand. Common visual disabilities include, but are not limited to, color blindness and dyslexia. One example of an aid for those with visual disabilities is a color transparency that increases visibility when physically laid over a display monitor.

A limitation of current physical color filters is that the color and opacity of the physical color filter cannot be varied to meet individual visibility needs. In particular, the brightness of images on a display monitor may vary depending on a computer application executing a video or other graphic being displayed, or even the type of display monitor used. Such variation limits the benefit of a physical color filter that does not adjust to the variations. In addition, different hues of color filters are needed for different visual disabilities, such that a different color filter is needed to be physically laid over a display monitor for each type of visual disability. For example, a red and green color filter may benefit one with color blindness while a rose hued color filter may benefit one with dyslexia.

Another limitation of current physical color filters is that not every display monitor utilized by an individual with a visual disability will include a physical color filter. For example, an individual may look at a television, a computer screen, an automatic teller machine display (ATM) and other display monitors during the day. Attaching a color filter to each of these multiple types of display monitors of multiple sizes is cumbersome to individuals.

Color filters provide a color hue that is translucent, such that the displayed image is visible through the color filter. Displaying windows with translucency in a graphical user interface is described in U.S. Pat. No. 5,892,511 where multiple windows are open and the top-level windows are displayed as translucent such that the user may view windows positioned below. However, merely displaying top-level windows as translucent does not aid a user with visual disabilities in viewing all information displayed on a monitor.

Therefore, in view of the foregoing, there is a need for a method, system and program for allowing users to selectively apply a color transparent window where the user may adjust the opacity and hue of the color transparent window applied over a display image in order to achieve optimum visibility for that user.

SUMMARY OF THE INVENTION

In view of the foregoing, it is therefore an object of the present invention to provide an improved method, system and program for an improved graphical user interface.

It is another object of the present invention to provide a method, system and program for applying tinted transparent filters to graphical images.

It is yet another object of the present invention to provide a method, system and program for applying an adjustable transparent filter to a graphical user interface according to visual disability needs.

According to one aspect of the present invention, a selection of a filter for a particular user is received. The filter is applied to at least a portion of an original image. The original image is then graphically displayed overlayed by the filter within a user interface, such that the original image is adjusted to specifically accommodate for a visual disability of the particular user. The original image may include a text image, a graphical image, and a video image. The filter is preferably specified according to a transparency, a tint and a hue. In addition, the display area of a filter may be specified to a first transparency, tint, and hue in a first portion and specified to a second transparency, tint, and hue in a second portion.

The filter selection may be received from a user dragging and dropping a selectable filter over an image within the user interface. The selectable filter may be automatically expanded to the size of the image.

In addition, the filter selection may be received from a user designating a particular selectable filter for automatic application to any applicable images within a user interface. For example, if a selectable filter applies to text images, then the filter will automatically apply to any text images currently displayed within the user interface.

The selectable filters may be graphically displayed in a selectable menu. The menu preferably includes generic filters designed for generic visual disabilities and individual filters specified to a particular user. The menu also offers users the option to add filters, edit filters, and visit a visual specialist. The visual specialist may be a doctor specializing in visual needs, such as an optometrist. In addition, a visual specialist may be a software application designed to test for visual disabilities and determine filtering that will best aid a user in viewing images within the user interface.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

A method, system, and program for applying translucent filters according to visual disability needs is provided. A translucent filter is a window displayed to be visible yet also show any windows on top of it and behind it. Advantageously, in the present invention, translucent filters may extend to the edges of a display monitor such that the application of the filter is not detectable. In addition, translucent filters may be selectively applied to portions of a display monitor, such as where any text is displayed.

This translucent effect may be further enhanced in any of a wide variety of conventional manners, such as by changing the color of the translucent filter, changing the intensity of the color of the translucent filter, and other adjustments to the opacity and hue of the translucent filter. In particular, a user may have a translucency profile that is detected by multiple diverse display monitors viewed by the user, where the translucency profile may be utilized to specify the color, opacity, and size of the translucent filter applied to multiple diverse display monitors.

Additionally, it is to be appreciated that although translucent filters are discussed herein, the present invention may use any other method which serves to visibly filter graphical displays to accommodate visual disabilities.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

The present invention may be executed in a variety of systems, including a variety of computing systems and electronic devices under a number of different operating systems. In one embodiment of the present invention, the computing system is a portable computing system such as a notebook computer, a palmtop computer, a personal digital assistant, a telephone or other electronic computing system that may also incorporate communications features that provide for telephony, enhanced telephony, messaging and information services. However, the computing system may also be, for example, a desktop computer, a network computer, a midrange computer, a server system or a mainframe computer. Therefore, in general, the present invention is preferably executed in a computer system that performs computing tasks such as manipulating data in storage that is accessible to the computer system. In addition, the computer system preferably includes at least one output device and at least one input device.

Figure 1:
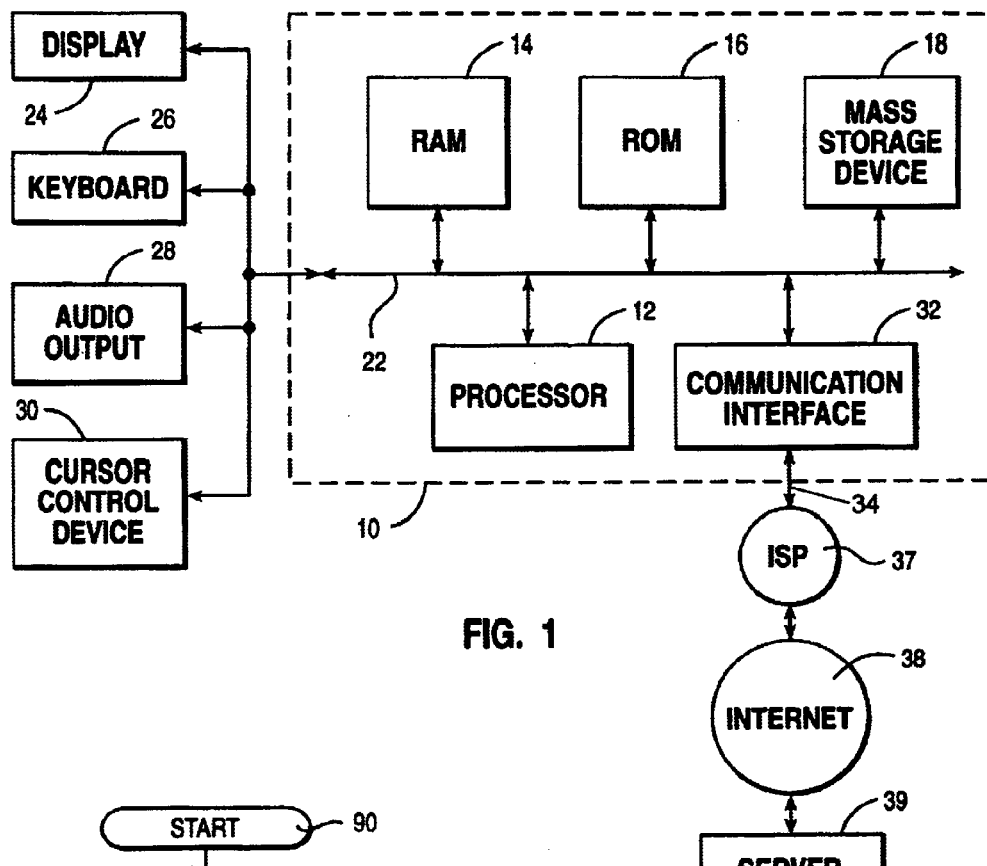
FIG. 1 depicts one embodiment of a computer system with which the method, system and program of the present invention may advantageously be utilized.

Referring now to the drawings and in particular to FIG. 1, there is depicted one embodiment of a computer system with which the method, system and program of the present invention may advantageously be utilized. Computer system 10 comprises a bus 22 or other communication device for communicating information within computer system 10, and at least one processing device such as processor 12, coupled to bus 22 for processing information. Bus 22 preferably includes low-latency and high-latency paths that are connected by bridges and controlled within computer system 10 by multiple bus controllers.

Processor 12 may be a general-purpose processor such as IBM's PowerPC™ processor that, during normal operation, processes data under the control of operating system and application software stored in a dynamic storage device such as random access memory (RAM) 14 and a static storage device such as Read Only Memory (ROM) 16. The operating system preferably provides a graphical user interface (GUI) to the user. In a preferred embodiment, application software contains machine executable instructions that when executed on processor 12 carry out the operations depicted in the flowchart of FIG. 5 and others described herein. Alternatively, the steps of the present invention might be performed by specific hardware components that contain hardwire logic for performing the steps, or by any combination of programmed computer components and custom hardware components.

The present invention may be provided as a computer program product, included on a machine-readable medium having stored thereon the machine executable instructions used to program computer system 10 to perform a process according to the present invention. The term "machine-readable medium" as used herein includes any medium that participates in providing instructions to processor 12 or other components of computer system 10 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM), a digital video disc-ROM (DVD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 10 can read and which is suitable for storing instructions. In the present embodiment, an example of non-volatile media is storage device 18. Volatile media includes dynamic memory such as RAM 14. Transmission media includes coaxial cables, copper wire or fiber optics, including the wires that comprise bus 22. Transmission media can also take the form of acoustic or light waves, such as those generated during radio wave or infrared data communications.

Moreover, the present invention may be downloaded as a computer program product, wherein the program instructions may be transferred from a remote computer such as a server 39 to requesting computer system 10 by way of data signals embodied in a carrier wave or other propagation medium via a network link 34 (e.g., a modem or network connection) to a communications interface 32 coupled to bus 22. Communications interface 32 provides a two-way data communications coupling to network link 34 that may be connected, for example, to a local area network (LAN), wide area network (WAN), or as depicted herein, directly to an Internet Service Provider (ISP) 37. In particular, network link 34 may provide wired and/or wireless network communications to one or more networks.

ISP 37 in turn provides data communication services through the Internet 38 or other network. Internet 38 may refer to the worldwide collection of networks and gateways that use a particular protocol, such as Transmission Control Protocol (TCP) and Internet Protocol (IP), to communicate with one another. ISP 37 and Internet 38 both use electrical, electromagnetic, or optical signals that carry digital or analog data streams. The signals through the various networks and the signals on network link 34 and through communication interface 32, which carry the digital or analog data to and from computer system 10, are exemplary forms of carrier waves transporting the information.

Further, multiple peripheral components may be added to computer system 10. For example, an audio output 28 is attached to bus 22 for controlling audio output through a speaker or other audio projection device. A display 24 is also attached to bus 22 for providing visual, tactile or other graphical representation formats. Display 24 may include both non-transparent surfaces, such as monitors, and transparent surfaces, such as headset sunglasses or vehicle windshield displays.

A keyboard 26 and cursor control device 30, such as a mouse, trackball, or cursor direction keys, are coupled to bus 22 as interfaces for user inputs to computer system 10. In alternate embodiments of the present invention, additional input and output peripheral components may be added.

Figure 2:
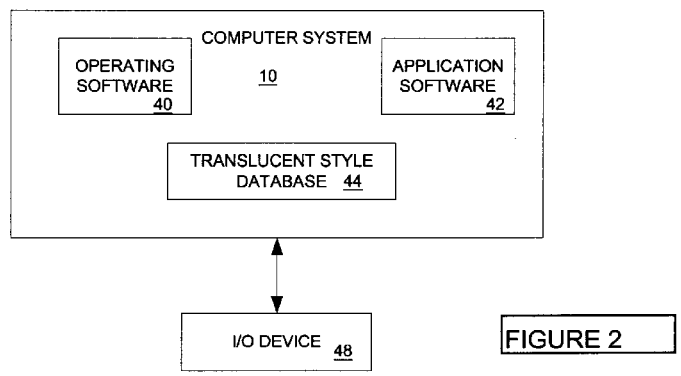
FIG. 2 illustrates a block diagram of a computer system for applying a transparent filter in accordance with the method, system, and program of the present invention.

With reference now to FIG. 2, there is depicted a block diagram of a computer system for applying a transparent filter in accordance with the method, system, and program of the present invention. As illustrated, computer system 10 includes operating software 40, application software 42, and a translucent style database 44, in addition to the hardware and software described in reference to computer system 10 in FIG. 1. Operating software 40, application software 42, and translucent style database 44 may reside in RAM, ROM, or other data storage media within computer system 10.

Computer system 10 receives input from and controls output to at least one input/output (I/O) device 48, such as a display monitor which receives touch selections and outputs display images. Advantageously, images intended for output to I/O device 48 may be adjusted to meet the visual needs of the user.

In the present invention, operating software 40 may include operating system software that enables a user to select to apply transparent filter overlays to an output image, such that the output image is more easily viewable by the user. Operating software 40 may access translucent style database 44 to provide a user with selectable filters.

In addition, in the present invention, application software 42 may include multiple applications, where each application enables a user to select to apply transparent filter overlays to an output image. Applications may include, for example, browsers, word processors, graphics applications, video editing programs. Application software 42 may access translucent style database 44 to provide a user with selectable filters.

In particular, a visual aid function operating within operating software 40 or application software 42 applies a transparent overlay image to an original output image prior to output to I/O device 48. The transparent overlay image is preferably specified by a user selection of at least one visual aid filter. In particular, color filters may be applied in order to aid viewers with visual disabilities.

Operating software 40 provides the advantage of enabling a user to initiate the application of filters to the display area independent of the application that is controlling the graphical output to the display area. However, application software 42 provides the advantage of utilizing software that has been customized to implement visual aid filters. For example, browser software may be customized to implement visual aid filters utilizing reader cascading style sheets (CSS) as described in U.S. patent application Ser. No. 10/054,446.

Transparent style database 44 preferably stores filters generically created according to visual disabilities and filters that have been specified according to a visual disability of a particular user. Filters may be specified to a particular transparency level, tint, hue. Filters may be applicable to an entire display area or applicable to particular types of graphical output including, but not limited to, text, data, graphics and video.

Advantageously, a user may load a specified filter into translucent style database 44 from a server system accessible via a network, from a web site that specifies filters, from a personal storage device, or other data storage media that are readable by computer system 10. Further, translucent style database 44 may store filter specifications in multiple formats, where operating software 40 or application software 42 may utilize different formats.

Figure 3:
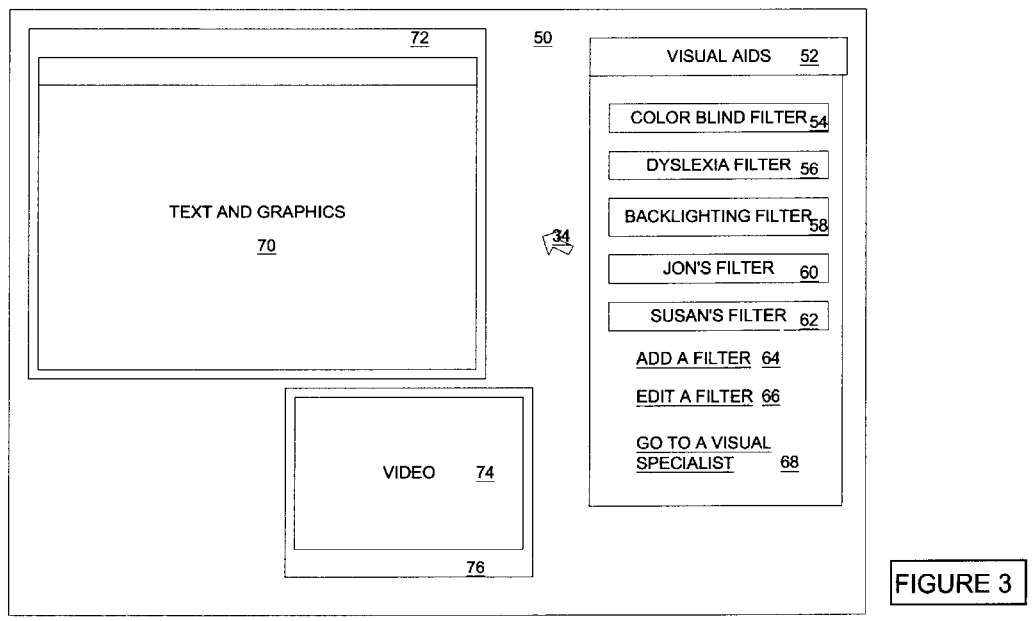
FIG. 3 depicts an illustrative example of a graphical user interface in which a user may select a visual aid in accordance with the method, system, and program of the present invention.

Referring now to FIG. 3, there is illustrated an illustrative example of a graphical user interface in which a user may select a visual aid in accordance with the method, system, and program of the present invention. As depicted, a user interface 50 is output within a display area of an output device, such as a display monitor. Advantageously, a user interacts with user interface 50 utilizing a cursor input 34, keypad inputs, voice inputs, and other available inputs.

According to the present invention, a user may select from multiple visual aid options. As illustrated, a visual aid selection unit 52 is displayed within user interface 50. Visual aid selection unit 52 may be initiated in response to a user selection from a pull down menu utilizing cursor 34, a keypad entry, a voice entry or other input that indicates a request for visual aids.

In the example, visual aids selection unit 52 includes multiple selectable filters 54-62. Advantageously, a user may drag and drop a selectable filter over a particular graphical area within user interface 50. In addition, a user may select the filter for application across the entire area of user interface 50.

Filter 72 is an example of a selectable filter from visual aids 52 that has been dragged and dropped over a text and graphical window 70. Although not depicted, filter 72 is preferably a transparent, tinted filter that adjusts the color of the text and graphics within window 70 such that the text and graphics are more easily viewed by the user.

In the example, the displayable area of filter 72 extends beyond the displayable area utilized by window 70, however in alternate embodiments, filter 72 may be the same size as window 70 or only cover a portion of window 70. In addition, where a user drags and drops a selectable filter from visual aids selection unit 52 over a definable object within user interface 50, the size of the filter may automatically expend to fill the selected area. In addition, a user may expand or reduce the size of the filter by pulling on the corners and sides of the filter.

While filter 72 may be specified for enhanced visual aid with text and graphics, filter 76, applied to a video display 74, may be specified for enhanced visual aid with video images. Further, while in the present example filters 72 and 76 individually overlay areas of user interface 50, in alternate embodiments, a single filter may overlay the entire area of user interface 50.

Within visual aids selection unit 52, in the example, there are generic selectable filters, including a color blind filter 54, a dyslexia filter 56, and a backlighting filter 58. Color blind filter 54 may, for example, include a red and green color transparency overlay. Dyslexia filter 56 may, for example, include a rose tinted transparency overlay. Backlighting filter 58 may, for example, may overlay a filter that is 100% transparent across a portion of the text and 10% transparent with a gray tint across the remainder of user interface 50 to better maintain the user's attention on the selected text.

In addition, there are individual selectable filters, such as Jon's filter 60 and Susan's filter 62. For example, Jon's filter 60 may be a transparent filter that is specified for overlay across text areas to change the text to a color that is most easily readable by Jon.

Further, a user is preferably provided with selectable options within visual aids selection unit 52. For example, the user may select an "add a filter" option 64, an "edit a filter" option 66, or a "go to a visual specialist" option 68. Where a user selects "go to a visual specialist" option 68, the user may be prompted with the locations of visual specialists, such as optometrists, within the user's area. In addition, the user may be prompted to visit a particular web site where, through a series of color chart and lighting tests, filters that will visually aid the user may be specified. Further, the operating system and/or application software may include color tests, that when taken by a viewer, will specify the visual needs of the viewer.

In addition to drag and drop filters, a user may specify a particular type of filter for automatic application to text, graphics, video, or an entire display area. A user may select one of selectable filters 54-62 for automatic application or may create a new filter for automatic application as an overlay within user interface 50. The filter may be automatically applied within user interface 50 during the duration of a user's use of computer system 10. Alternatively, the filter may be automatically applied only to those images currently displayed within user interface 50.

By allowing a user to automatically apply an overlay filter and/or selectively apply a drag and drop overlay filter, the user is enabled to specify visual aids according to the user's individual visual disabilities.

Figure 4:
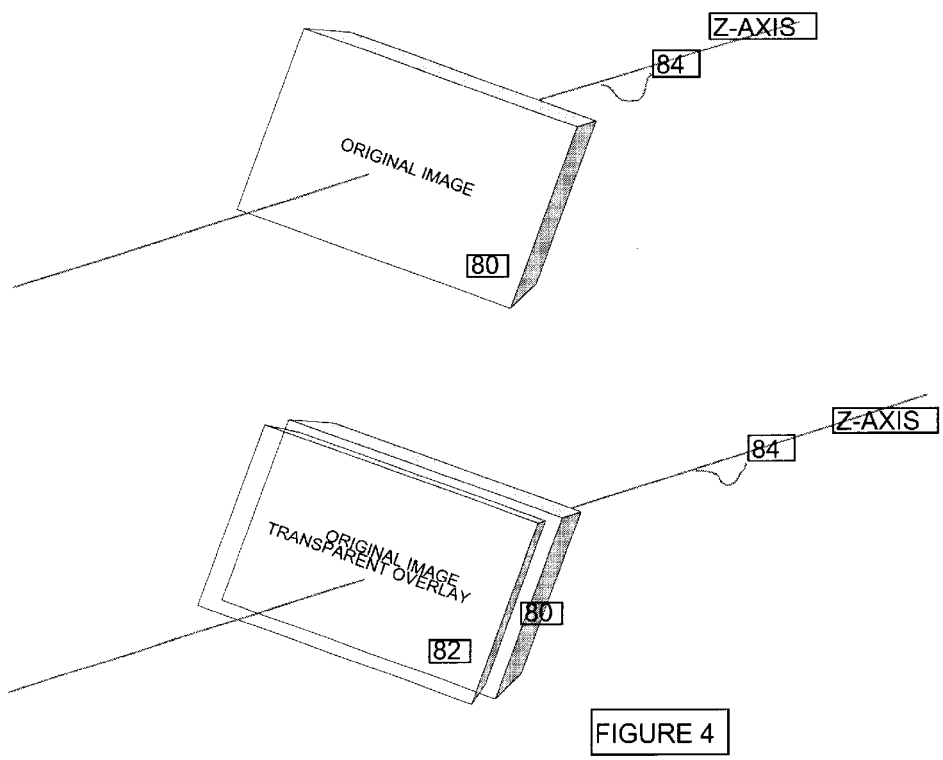
FIG. 4 illustrates an illustrative example of a transparent overlay in accordance with the method, system, and program of the present invention.

Referring now to FIG. 4, there is illustrated an illustrative example of a transparent overlay in accordance with the method, system, and program of the present invention. As illustrated, an original image 80 is depicted along a z-axis 84 within a user interface. Original image 80 may include graphics, video, text, and other displayable objects.

According to one advantage of the present invention, a transparent overlay 82 is applied to original image 80 along z-axis 84, wherein original image 80 is visible through transparent overlay 82. In particular, transparent overlay 82 may overlap all of original image 80 or may only overlap portions of original image 80. In addition, transparent overlay 82 is preferably defined by a particular tint, hue and level of transparency.

Figure 5:
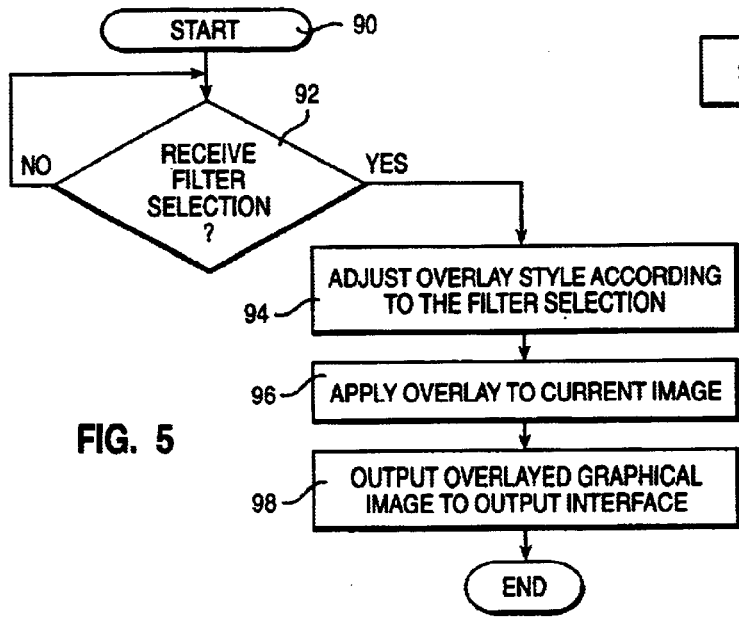
FIG. 5 depicts a high level logic flowchart of a process and program for applying a transparent overlay in accordance with the method, system, and program of the present invention.

With reference now to FIG. 5, there is depicted a high level logic flowchart of a process and program for applying a transparent overlay in accordance with the method, system, and program of the present invention. As illustrated, the process starts at block 90 and thereafter passes to block 92.

Block 92 depicts a determination as to whether or not a filter selection is received. A filter selection may be indicated by a user dragging and dropping a selectable filter to a particular region of a user interface. In addition, a filter selection may be indicated by a user selecting a selectable filter to be automatically applied within the user interface. If a filter selection is not received, then the process iterates at block 92. If a filter selection is received, then the process passes to block 94.

Block 94 illustrates adjusting an overlay style according to the filter selection received. In particular, the overlay style may include a style file for controlling the appearance of a transparency overlay output. Next, block 96 depicts applying the transparency overlay over the portions of the current output image affected by the filter selection. Thereafter, block 98 illustrates outputting the overlayed graphical image to an output interface, and the process ends.

While the invention has been particularly shown and described with reference to a preferred embodiment, it will be understood by those skilled in the art that various changes in form and detail may be made therein without departing from the spirit and scope of the invention.

What is claimed is:

1. A method for adjusting a graphical display, said method comprising the steps of:

graphically displaying at least one selectable visual disability type;

responsive to receiving a selection from among said at least one selectable visual disability type by a particular user, automatically selecting a filter with at least one filter characteristic specified to aid said particular user with a particular type of visual disability;

applying said filter to at least a portion of an original image; and graphically displaying said original image overlayed by said filter within a user interface, such that said original image is adjusted to specifically accommodate for said visual disability of said particular user.

2. The method for adjusting a graphical display according to claim 1, wherein said original image comprises at least one from among a text image, a graphical image and a video image.

3. The method for adjusting a graphical display according to claim 1, said step of receiving a selection further comprising the step of:

automatically selecting said filter, wherein said filter is a selectable filter dragged and dropped within said user interface.

4. The method for adjusting a graphical display according to claim 3, said method further comprising:

expanding said selectable filter to a size of a display area of said at least a portion of said original image.

5. The method for adjusting a graphical display according to claim 1, said step of receiving a selection further comprising the step of:

automatically selecting said filter, wherein said filter is a selectable filter that when selected automatically designates said at least a portion of said original image comprising a predetermined type of image to be displayed within said user interface.

6. The method for adjusting a graphical display according to claim 1, said method further comprising the step of:

graphically displaying a selectable menu of said at least one selectable visual disability type.

7. The method for adjusting a graphical display according to claim 1, said method further comprising the step of:

graphically displaying said at least one selectable visual disability type, wherein said filter, automatically selected responsive to said selection from among said at least one selectable visual disability type, is specified to aid any user with said particular type of visual disability.

8. The method for adjusting a graphical display according to claim 1, wherein said filter is specified to a particular transparency, a particular tint, and a particular hue.

9. The method for adjusting a graphical display according to claim 1, wherein said filter is specified to a first transparency, a first tint and a first hue within a first portion of a display area of said filter and is specified to a second transparency, a second tint, and a second hue within a second portion of said display area of said filter.

10. A system for adjusting a graphical display, said system comprising:

a graphical user interface;

means for graphically displaying at least one selectable visual disability type within said graphical user interface;

means, responsive to receiving a selection from among said at lest one selectable visual disability type by a particular user, for automatically selecting a filter with at least one filter characteristic specified to aid said particular user with a particular type of visual disability;

means for applying said filter to at least a portion of an original image; and means for graphically displaying said original image overlayed by said filter within said graphical user interface.

11. The system for adjusting a graphical display according to claim 10, wherein said original image comprises at least one from among a text image, a graphical image and a video image.

12. The system for adjusting a graphical display according to claim 10, said means for receiving a selection further comprising:

means for automatically selecting said filter, wherein said filter is a selectable filter dragged and dropped within said user interface.

13. The system for adjusting a graphical display according to claim 12, said system further comprising:

means for expanding said selectable filter to a size of a display area of said at least a portion of said original image.

14. The system for adjusting a graphical display according to claim 10, said means for receiving a selection further comprising:

means for automatically selecting said filter, wherein said filter is a selectable filter that when selected automatically designates said at least a portion of said original image comprising a predetermined type of image to be displayed within said user interface.

15. The system for adjusting a graphical display according to claim 10, said system further comprising:

means for graphically displaying a selectable menu of said at least one selectable visual disability type.

16. The system for adjusting a graphical display according to claim 10, said system further comprising:

means for graphically displaying said at least one selectable visual disability type, wherein said filter, automatically selected responsive to said a selection of from among said at least one selectable visual disability type, is specified to aid any user with said particular type of visual disability.

17. The system for adjusting a graphical display according to claim 10, wherein said filter is specified to a particular transparency, a particular tint, and a particular hue.

18. The system for adjusting a graphical display according to claim 10, wherein said filter is specified to a first transparency, a first tint and a first hue within a first portion of a display area of said filter and is specified to a second transparency, a second tint, and a second hue within a second portion of said display area of said filter.

19. A program for adjusting a graphical display, residing on a computer usable medium having computer readable program code means, said program comprising:

means for enabling a graphical display of at least one selectable visual disability type;

means for enabling receipt of a selection from among said at least one selectable visual disability type by a particular user;

means, responsive to receiving said selection from among said at least one selectable visual disability type, for automatically selecting a filter with at least one filter characteristic designated to specifically accommodate a visual disability of a particular user;

means for applying said filter to at least a portion of an original image; and means for controlling a graphical display graphically displaying said original image overlayed by said filter.

20. The program for adjusting a graphical display according to claim 19, said program further comprising:

means for automatically selecting said filter, wherein said filter is a selectable filter dragged and dropped within said user interface.

21. The program for adjusting a graphical display according to claim 20, said program further comprising:

means for expanding said selectable filter to a size of a display area of said at least a portion of said original image.

22. The program for adjusting a graphical display according to claim 19, said program further comprising:

means for automatically selecting said filter, wherein said filter is a selectable filter that when selected automatically designates said at least a portion of said original image comprising a predetermined type of image to be displayed within said user interface.

23. The program for adjusting a graphical display according to claim 19, said program further comprising:

means for controlling a graphical display of a selectable menu of said at least one selectable visual disability type.

24. The program for adjusting a graphical display according to claim 19, said program further comprising:

means for controlling a graphical display of said at least one selectable visual disability type, wherein said filter, automatically selected responsive to said selection from among said at least one selectable visual disability type, is specified to aid any user with said particular type of visual disability.

* * * * *